(12) United States Patent
Joo

(10) Patent No.: US 11,529,883 B2
(45) Date of Patent: Dec. 20, 2022

(54) ELECTRIC VEHICLE CHARGING SYSTEM AND OPERATION METHOD THEREOF

(71) Applicant: LG ELECTRONICS INC., Seoul (KR)

(72) Inventor: Young Jun Joo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 720 days.

(21) Appl. No.: 16/555,872

(22) Filed: Aug. 29, 2019

(65) Prior Publication Data
US 2019/0381908 A1 Dec. 19, 2019

(30) Foreign Application Priority Data
Jul. 29, 2019 (KR) .................. 10-2019-0091843

(51) Int. Cl.
*B60L 53/30* (2019.01)
*G06F 3/14* (2006.01)
(Continued)

(52) U.S. Cl.
CPC ............. *B60L 53/30* (2019.02); *B60L 53/305* (2019.02); *G06F 3/14* (2013.01); *G06F 3/16* (2013.01);
(Continued)

(58) Field of Classification Search
CPC ... G06F 3/14; G06F 3/16; G06F 3/167; B60L 2250/16; B60L 53/30; B60L 53/305; B60L 53/65; G06T 2207/30252; G06T 7/70; G06V 10/10; G06V 20/52; G06V 20/625; G06V 2201/08; G08G 1/142; Y02T 10/70;
(Continued)

(56) References Cited

U.S. PATENT DOCUMENTS

2012/0236149 A1* 9/2012 Nagy .................. B60L 53/65
348/148
2017/0255881 A1* 9/2017 Ritch ............... G08G 1/096822

FOREIGN PATENT DOCUMENTS

CN 208291012 U * 12/2018 .............. B60L 53/30
KR 10-2019-0071873 A 6/2019
KR 10-1999291 B1 7/2019

* cited by examiner

Primary Examiner — Dakshesh D Parikh
(74) Attorney, Agent, or Firm — Birch, Stewart, Kolasch & Birch, LLP

(57) ABSTRACT

An electric vehicle charging system and an operation method thereof are provided. The electric vehicle charging system may include a controller, a camera configured to capture a vehicle that is present in a charging station and transmit image information about the vehicle to the controller, a guide unit configured to receive guidance from the controller and output the guidance, and a plurality of chargers provided in the charging station and communicably connected to the controller. The controller may analyze information about the vehicle based on the image information received from the camera, may guide a member vehicle registered to receive charging service to move to a charger for members, may guide a nonmember vehicle to move to a charger for nonmembers, and may adjust a ratio of the number of chargers for members to the number of chargers for nonmembers according to an estimated waiting time for charging of the vehicle. The electric vehicle charging system may transmit and receive a wireless signal on a mobile communication network constructed according to 5th generation (5G) communication.

15 Claims, 5 Drawing Sheets

(51) Int. Cl.
    *G06F 3/16*          (2006.01)
    *G08G 1/14*          (2006.01)
    *G06T 7/70*          (2017.01)
    *G06V 10/10*        (2022.01)
    *G06V 20/62*        (2022.01)

(52) U.S. Cl.
    CPC ............... *G06T 7/70* (2017.01); *G06V 10/10* (2022.01); *G08G 1/142* (2013.01); *G06T 2207/30252* (2013.01); *G06V 20/625* (2022.01); *G06V 2201/08* (2022.01)

(58) Field of Classification Search
    CPC ..... Y02T 10/7072; Y02T 90/12; Y02T 90/16; Y02T 90/167; Y04S 30/14
    See application file for complete search history.

ELECTRIC VEHICLE CHARGING SYSTEM AND OPERATION METHOD THEREOF

CROSS-REFERENCE TO RELATED APPLICATION

This present application claims benefit of priority to Korean Patent Application No. 10-2019-0091843, entitled "Electric vehicle charging system and operation method thereof," filed on Jul. 29, 2019, in the Korean Intellectual Property Office, the entire disclosure of which is incorporated herein by reference.

BACKGROUND

1. Technical Field

Embodiments of the present disclosure relate to an electric vehicle charging system and an operation method thereof. More particularly, embodiments of the present disclosure relate to an electric vehicle charging system and an operation method thereof for quick and convenient charging of an electric vehicle.

2. Description of Related Art

Contents which will be described hereinafter serve simply to provide background information about embodiments.

The use of electric vehicles has become more widespread. Unlike internal combustion engine vehicles, electric vehicles do not generate combustion exhaust. Thus, electric vehicles have drawn attention as being one method for solving an environmental issue that has become bigger in recent years.

There is an importance in the issue of charging electric vehicles. Internal combustion engine vehicles may be refueled in a short amount of time, whereas a longer amount of time may be required to charge electric vehicles, which may cause inconvenience.

In particular, large capacity batteries for electric vehicles are currently being developed, but a long duration of time is required to charge such large capacity batteries in comparison to other batteries.

Batteries capable of being quickly charged and chargers capable of quick charging need to be developed, but it is also necessary to promote charging systems of charging stations for electric vehicles for quick charging.

In addition, since the number of chargers in a charging station is limited, when a large number of electric vehicles are clustered in a charging station at the same time, an inconvenience may be caused for all of the electric vehicles.

For this reason, there is a need for quick and convenient charging of electric vehicles by providing better charging to member vehicles when vehicles are classified into member vehicles and nonmember vehicles.

Korean Patent Registration No. 10-1999291, entitled "Electric vehicle charging infrastructure system using data distribution service," discloses an infrastructure system using a data distribution service for electric vehicle charging.

Korean Patent Application Publication No. 10-2019-0071873, entitled "Centralized system for charging an electric car," discloses a centralized electric vehicle charging system in which a single power supply device may manage a plurality of electric vehicle charging outlets installed in a parking lot.

However, the above documents do not disclose a configuration in which vehicles are classified into member vehicles and nonmember vehicles to provide better charging to the member vehicles.

SUMMARY OF THE INVENTION

An aspect of the present disclosure is to provide an electric vehicle charging system and an operation method thereof which have a configuration in which vehicles are classified into member and nonmember vehicles to provide better charging to the member vehicles.

An aspect of the present disclosure is to provide a method for adjusting a ratio of the number of chargers for members to the number of chargers for nonmembers to provide member vehicles with more convenient and quicker charging in comparison to nonmember vehicles.

An aspect of the present disclosure is to provide a method for maintaining a minimum number of chargers for nonmembers to avoid an occurrence of a situation that is disadvantageous for nonmember vehicles.

An aspect of the present disclosure is to provide a method for guiding movement of an electric vehicle in a charging station so that the electric vehicle may be quickly and conveniently charged.

However, technical aspects mentioned in the embodiments are not limited to the foregoing technical aspects, and other technical aspects which are not mentioned herein would be clearly understood by one of ordinary skill in the art to which the embodiments belong from the following description.

In order to achieve the above-described aspects, an electric vehicle charging system used for operation of an electric vehicle charging station may include a controller, a camera configured to capture a vehicle that is present in a charging station and transmit image information about the vehicle to the controller, a guide unit configured to receive guidance from the controller and output the guidance, and a plurality of chargers provided in the charging station and communicably connected to the controller.

The controller may analyze information about the vehicle based on the image information received from the camera, may guide a member vehicle registered to receive charging service to move to a charger for members, may guide a nonmember vehicle to move to a charger for nonmembers, and may adjust a ratio of the number of chargers for members to the number of chargers for nonmembers according to an estimated waiting time for charging of the vehicle.

The camera may capture an exterior of the vehicle and a license plate number of the vehicle, and may transmit an image of the exterior of the vehicle and the license plate number of the vehicle to the controller.

The guide unit may include a signage disposed in the charging station, an output device mounted in the vehicle and configured to output at least one of image or voice, a speaker disposed in the charging station, and a display disposed in the charger.

When the vehicle is a member vehicle, the guide unit may provide guidance by using at least one of the signage, the output device, the speaker, or the display.

When the vehicle is a nonmember vehicle, the guide unit may provide guidance by using at least one of the signage, the speaker, or the display.

The controller may transmit information about a parking location of the vehicle in the charging station and an available charging area for the vehicle to the guide unit. The guide unit may guide the parking location of the vehicle and may display an image indicating the available charging area.

The guide unit may output a voice that guides the parking location of the vehicle.

The controller may determine whether a charging port provided in the vehicle is in the available charging area. When the charging port is not in the available charging area, the guide unit may guide a movement and a movement direction of the vehicle so that the charging port enters the available charging area.

When the vehicle is a member vehicle, the controller may analyze a location of the charging port in the vehicle from registered vehicle information.

When the vehicle is a nonmember vehicle, the controller may analyze a location of the charging port in the vehicle from the exterior of the vehicle and the license plate number of the vehicle captured by the camera.

The controller may assign the chargers to the plurality of vehicles. When the vehicle approaches a charger that is not assigned, the guide unit may guide the vehicle such that the vehicle may move to the location of the charger that is assigned to the vehicle.

An operation method of an electric vehicle charging system may include: analyzing, by a controller, vehicle information; assigning, by the controller, a charger to a vehicle; guiding, by a guide unit, a location of the assigned charger; determining, by the controller, whether the vehicle approaches the assigned charger; displaying, by the guide unit, an image indicating an available charging area; determining, by the controller, whether a charging port provided in the vehicle is in the available charging area; and charging the vehicle.

The controller may analyze information about the vehicle based on the image information received from a camera, may guide a member vehicle registered to receive charging service to move to a charger for members, may guide a nonmember vehicle to move to a charger for nonmembers, and may adjust a ratio of the number of chargers for members to the number of chargers for nonmembers according to an estimated waiting time for charging of the vehicle.

The total number of chargers obtained by adding the number of chargers for members and the number of chargers for nonmembers may have a predetermined value. The controller may control the number of chargers for members and the number of chargers for nonmembers such that each of the number of chargers for members and the number of chargers for nonmembers may be maintained to be equal to or greater than a set value.

When the estimated waiting time for charging of the member vehicle is greater than a set expected waiting time for charging of the member vehicle, and when the number of chargers for nonmembers is greater than a set minimum number of chargers for nonmembers, the controller may increase the number of chargers for members and may decrease the number of chargers for nonmembers.

When the estimated waiting time for charging of the member vehicle is less than or equal to the set expected waiting time for charging of a member vehicle, when the estimated waiting time for charging of the nonmember vehicle is greater than a set expected waiting time for charging of the nonmember vehicle, and when the number of chargers for members is greater than a set minimum number of chargers for members, the controller may increase the number of chargers for nonmembers and may decrease the number of chargers for members.

When the number of chargers for members and the number of chargers for nonmembers are changed, and when a changed estimated waiting time for charging of the member vehicle is greater than the set expected waiting time for charging of the member vehicle, the controller may maintain a ratio of the changed number of chargers for members to the changed number of chargers for nonmembers.

According to embodiments, an electric vehicle charging system may guide information required for charging of a vehicle in a charging station via a guide unit, thereby improving convenience in vehicle charging, and promoting quick charging.

According to embodiments, an electric vehicle charging system may distinguish member vehicles from nonmember vehicles and may provide a differentiated service that favors member vehicles, thereby inducing an owner or a driver of a vehicle to receive member services.

According to embodiments, a quick charging service may be provided to member vehicles by properly adjusting a ratio of the number of chargers for members to the number of chargers for nonmembers, thereby inducing an owner or a driver of a vehicle to receive member services.

BRIEF DESCRIPTION OF THE DRAWINGS

The foregoing and other aspects and features of the present disclosure, as well as the following detailed description of the embodiments, will be better understood when read in conjunction with the accompanying drawings. For the purpose of illustrating the present disclosure, there is shown in the drawings an exemplary embodiment, it being understood that the present disclosure is not intended to be limited to the details shown as various modifications and structural changes may be made therein without departing from the spirit of the present disclosure and within the scope and range of the claims. The use of the same reference numerals or symbols in different drawings indicates similar or identical items.

DETAILED DESCRIPTION

Figure 1:
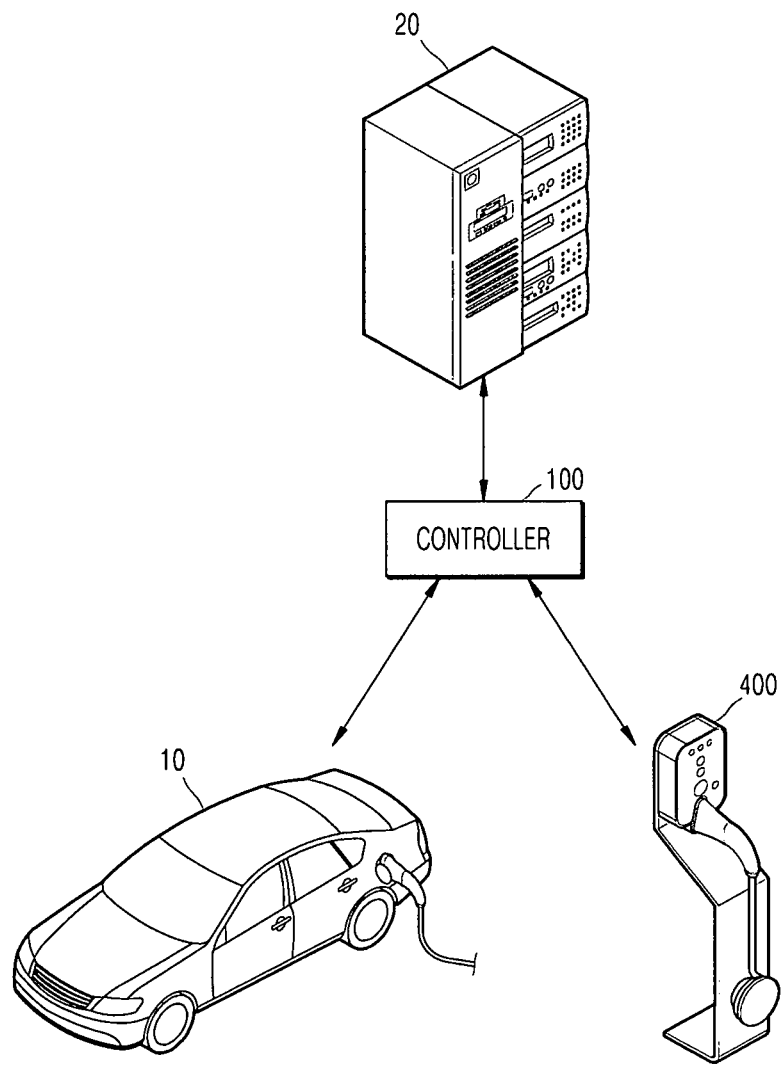
FIG. 1 is a diagram illustrating an electric vehicle charging system according to an embodiment.

Hereinbelow, embodiments will be described in detail with reference to the accompanying drawings. The embodiments may be modified in various ways and may have various forms, and specific embodiments will be illustrated in the drawings and will be described in detail herein. However, this is not intended to limit the embodiments to the specific embodiments, and the embodiment should be understood as including all modifications, equivalents, and replacements that fall within the spirit and technical scope of the embodiments.

The terms such as "first," "second," and other numerical terms may be used herein only to describe various elements and only to distinguish one element from another element, and as such, these elements should not be limited by these terms. In addition, terms, which are specially defined in consideration of the configurations and operations of the embodiments, are given only to explain the embodiments, and do not limit the scope of the embodiments.

In the following description of the embodiments, it will be understood that when each element is referred to as being formed "on" or "under" the other element, it can be directly "on" or "under" the other element or be indirectly formed with one or more intervening elements therebetween. In addition, it will also be understood that "on" or "under" the element may mean an upward direction and a downward direction of the element.

In addition, the relative terms "top/upper/above," "bottom/lower/under," and the like used herein may be used to distinguish between any one substance or element and other substances or elements without necessarily requiring or implying any physical or logical relationship between the substances or elements or a particular order.

Figure 2:
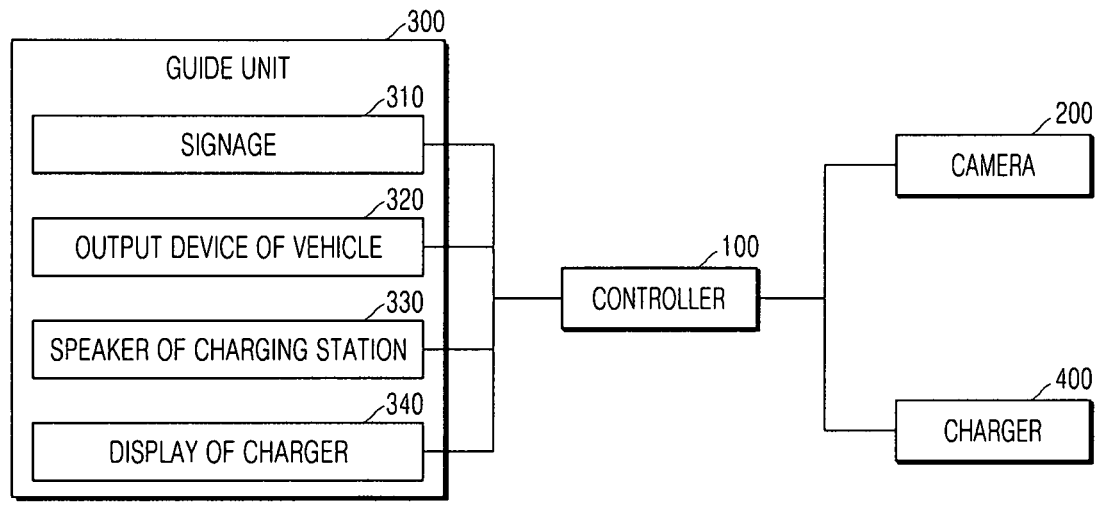
FIG. 2 is a diagram illustrating a configuration of an electric vehicle charging system according to an embodiment.

FIG. 1 is a diagram illustrating an electric vehicle 10 charging system according to an embodiment. FIG. 2 is a diagram illustrating a configuration of the electric vehicle 10 charging system according to an embodiment. The electric vehicle 10 charging system may be used for operation of the electric vehicle 10 charging station. For example, the electric vehicle charging system may be used for operation of a charging station for charging a plug-in electric vehicle 10.

The electric vehicle charging system may include a controller 100. The controller 100 may be provided in a charging station and may control a process required for charging of the vehicle 10 such as assignment and charging of the electric vehicle 10. For example, the controller 100 may be a device that is connected to a camera 200, a guide unit 300, and a charger 400 which will be described below, and that is configured to control the camera 200, the guide unit 300, and the charger 400, and may also be provided as a single module.

Referring to FIG. 1, the controller 100 may be communicably connected to the vehicle 10, a server 20, and the charger 400. The controller 100 may be wirelessly connected to the vehicle 10, and may be connected via a wire or wirelessly to the server 20 and the charger 400.

The controller 100 may be connected to the server 20, and may receive, from the server 20, information about a vehicle 10 that is registered as a member vehicle to receive charging service and information about an owner or a driver of the vehicle 10.

The controller 100 may be connected to the charger 400, may transmit guidance information, for charging that will be described below, to the charger 400, and may control the charger 400 required for charging of the vehicle 10. The controller 100 may connect the charger 400 to the vehicle 10 registered as a member vehicle and may transmit the guidance information for charging to the vehicle 10.

The electric vehicle charging system may include a communication unit. The communication unit may be connected to the controller 100, and the controller 100 may communicate with the vehicle 10, the server 20, and the charger 400 via the communication unit. When the controller 100 is wirelessly connected to the vehicle 10, the server 20, and the charger 400, the communication unit may be configured to include at least one of a mobile communication module or a wireless Internet module. In addition, the communication unit may further include a short-range communication module.

The mobile communication module may transmit and receive a wireless signal to and from at least one of a base station, an external terminal or the server 20 on a mobile communication network constructed according to technical standards or communication schemes for mobile communication, for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), and 5G mobile communication.

The wireless Internet module may refer to a module for wireless Internet access. The wireless Internet module may be configured to transmit and receive a wireless signal over a communication network conforming to wireless Internet technologies.

The controller 100 may transmit and receive data, via a 5G network, to and from the server 20, various communicable terminals such as the vehicle 10, and a terminal provided in the charger 400. In particular, the controller 100 may perform data communication with the server 20 and a terminal via the 5G network by using at least one service of an enhanced mobile broadband (eMBB), ultra-reliable and low latency communications (URLLC), or massive machine-type communications (mMTC).

The Enhanced Mobile Broadband (eMBB) is a mobile broadband service, and provides, for example, multimedia contents and wireless data access. In addition, improved mobile services such as hotspots and broadband coverage for accommodating the rapidly growing mobile traffic may be provided via eMBB. Through a hotspot, the high-volume traffic may be accommodated in an area where user mobility is low and user density is high. Through broadband coverage, a wide-range and stable wireless environment and user mobility may be guaranteed.

The Ultra-reliable and low latency communications (URLLC) service defines requirements that are far more stringent than existing LTE in terms of reliability and transmission delay of data transmission and reception, and corresponds to a 5G service for production process automation in the industrial field, telemedicine, remote surgery, transportation, safety, and the like.

The Massive Machine-type communications (mMTC) is a transmission delay-insensitive service that requires a relatively small amount of data transmission. The mMTC enables a much larger number of terminals 300, such as sensors, than general mobile cellular phones to be simultaneously connected to a wireless access network. In this case, the communication module price of the terminal should be inexpensive, and there is a need for improved power efficiency and power saving technology capable of operation for years without battery replacement or recharging.

Referring to FIG. 2, the electric vehicle 10 charging system may further include the camera 200, the guide unit 300, and the charger 400.

The camera 200 may capture the vehicle 10 that is present in the charging station and may transmit image information about the vehicle 10 to the controller 100. A plurality of cameras 200 may be provided in the charging station, and each of the cameras 200 may be used to recognize a license plate of the vehicle 10 or recognize an exterior of the vehicle 10. In addition, the camera 200 may be used to recognize a location of the vehicle 10.

The controller 100 may analyze, from the image information about the vehicle 10 received from the camera 200, whether the vehicle 10 is a member vehicle, whether the vehicle 10 is an electric vehicle, the location of the vehicle 10 in the charging station, whether the vehicle 10 is parked in an available charging area 1000, and other information required for charging of the vehicle 10.

A plurality of chargers 400 may be provided in the charging station and may be communicably connected to the controller 100. The chargers 400 may provide required electricity to charge the vehicle 10. Each of the chargers 400 may be assigned as a charger for members or nonmembers by the controller 100, which will be described in detail below.

The guide unit 300 may receive guidance from the controller 100 and may output the guidance. Here, the guidance may refer to all information, provided to guide the driver, required for charging of the vehicle 10 in the electric vehicle charging system.

The controller 100 may analyze information about the vehicle 10 based on the image information received from the camera 200, may guide a member vehicle 10 registered to receive charging service to move to a charger 400 for members, and may guide a nonmember vehicle 10 to move to a charger 400 for nonmembers.

Here, the controller 100 may transmit details required for guidance to the guide unit 300, and the guide unit 300 may output guidance by using, for example, an image or voice, and may provide guidance to the driver of the vehicle 10.

For example, the camera 200 may capture the exterior of the vehicle 10 and a license plate number of the vehicle 10, and may transmit an image of the exterior and the license plate number of the vehicle 10 to the controller 100. The controller 100 may analyze information about the vehicle 10 based on image information received from the camera 200.

The controller 100 may assign a parking space for charging to the vehicle 10, may generate guidance required for the vehicle 10 to easily move to the assigned parking space and other guidance required for charging of the vehicle 10, and may transmit the guidance to the guide unit 300.

The guide unit 300 may include a signage 310, an output device 320 of the vehicle 10, a speaker 330 of the charging station, and a display 340 of the charger 400.

A plurality of signage 310 may be provided in the charging station, and an image or text for guiding movement of the vehicle 10 may be displayed on the signage 310. For example, the signage 310 may display an identification number of the parking space assigned for charging of the vehicle 10, a location of the parking space, and an indicator such as an arrow indicating a movement path from a current location of the vehicle 10 to the assigned parking space.

The output device 320 may be mounted in the vehicle 10 and may output at least one of image or voice. The output device 320 may be provided as, for example, a navigation device, and a device mounted in a dashboard of the vehicle 10 and configured to output the voice and the image.

The output device 320 may display an image or text for guiding movement of the vehicle 10. A display method may be identical or similar to that described above in the signage 310.

The output device 320 may output the voice that guides movement of the vehicle 10. That is, the output device 320 may guide a user by outputting, through voice, for example, the above-described identification number of the parking space, the location of the parking space, and the movement path to the parking space of the vehicle 10.

At least one speaker 330 may be disposed in the charging station, and may output the voice that guides movement of the vehicle 10 to a plurality of drivers of vehicles 10 in the charging station.

Similarly to the output device 320, the speaker 330 may guide the user by outputting, through voice, for example, the above-described identification number of the parking space, the location of the parking space, and the movement path to the parking space of the vehicle 10.

Since the output device 320 is provided in each of the vehicles 10, each of the vehicles 10 may be given individualized guidance. Since the speaker 330 is provided in the charging station, all the vehicles 10 in the charging station may be given guidance.

The display 340 may be disposed in the charger 400. The display 340 may display the image or text for guiding movement of the vehicle 10. A display method may be identical or similar to those described above in the signage 310 and the output device 320.

The signage 310, the output device 320, and the display 340 may display the available charging area 1000, and the driver may drive the vehicle 10 while viewing the displayed available charging area 1000 to allow a charging port 11 of the vehicle 10 to enter the available charging area 1000. The available charging area 1000 will be described in detail below.

In the case of a member vehicle 10, the guide unit 300 may provide guidance by using at least one of the signage 310, the output device 320, the speaker 330, or the display 340. In the case of the member vehicle 10, the controller 100 may be communicably connected to the output device 320 of the vehicle 10.

For example, when the vehicle 10 is determined to be a member vehicle 10 through recognition of the license plate of the vehicle 10, the controller 100 may send a communication request to the vehicle 10. When the driver grants the communication request and takes action required for communication, the controller 100 and the output device 320 of the vehicle 10 may be connected, and the output device 320 may output guidance received from the controller 100 through at least one of image or voice.

The driver of the member vehicle 10 may charge the vehicle 10 while driving through the output device 320 which is provided in the vehicle 10 and which is convenient in comparison to, for example, the signage 310, the speaker 330, and the display 340.

In the case of a nonmember vehicle 10, the guide unit 300 may provide guidance by using at least one of the signage 310, the speaker 330, or the display 340. In the case of the nonmember vehicle 10, it is difficult for the controller 100 to know, for example, an ID or an authentication number of the output device 320 provided in the vehicle 10, unlike the member vehicle 10. Therefore, it may be difficult for the controller 100 to access the output device 320 of the vehicle 10 for communication.

Thus, in the case of the nonmember vehicle 10, although the output device 320 is provided in the vehicle 10, the controller 100 may not be connected to the output device 320 and may provide guidance by using the signage 310, the speaker 330, and the display 340.

The controller 100 may verify the license plate of the vehicle 10 that enters the charging station, may determine whether the vehicle 10 is a member vehicle or a nonmember vehicle, and may guide the vehicle 10 to move to the charger 400 for members or the charger 400 for nonmembers depending on whether the vehicle 10 is a member or nonmember vehicle, via the guide unit 300.

The controller 100 may classify the chargers 400 into chargers for members and chargers for nonmembers, and may assign the chargers 400 to a plurality of vehicles 10, respectively. In addition, when the vehicle 10 approaches the charger 400, the controller 100 may receive image information from the camera 200 and may determine whether the vehicle 10 approaches the charger 400 that is assigned to the vehicle 10.

For example, when the vehicle 10 does not approach the charger 400 assigned to the vehicle 10, the controller 100 may guide the vehicle 10 to move to the assigned charger 400 through the guide unit 300. Thus, the nonmember vehicle 10 may be prevented from moving to the member charger 400 for convenience purpose.

For example, when the vehicle 10 approaches the charger 400 that is not assigned to the vehicle 10, the guide unit 300 may guide the driver to move the vehicle 10 to the location of the charger 400 assigned to the vehicle 10 by using at least one of the signage 310, the output device 320, the speaker 330, or the display 340.

When the nonmember vehicle 10 approaches the charger 400 for members, the controller 100 may provide guidance, by means of at least one of an image or a voice, via the guide unit 300 indicating that the nonmember vehicle 10 is unable use the charger 400 because the charger 400 is a charger for members.

Figure 3:
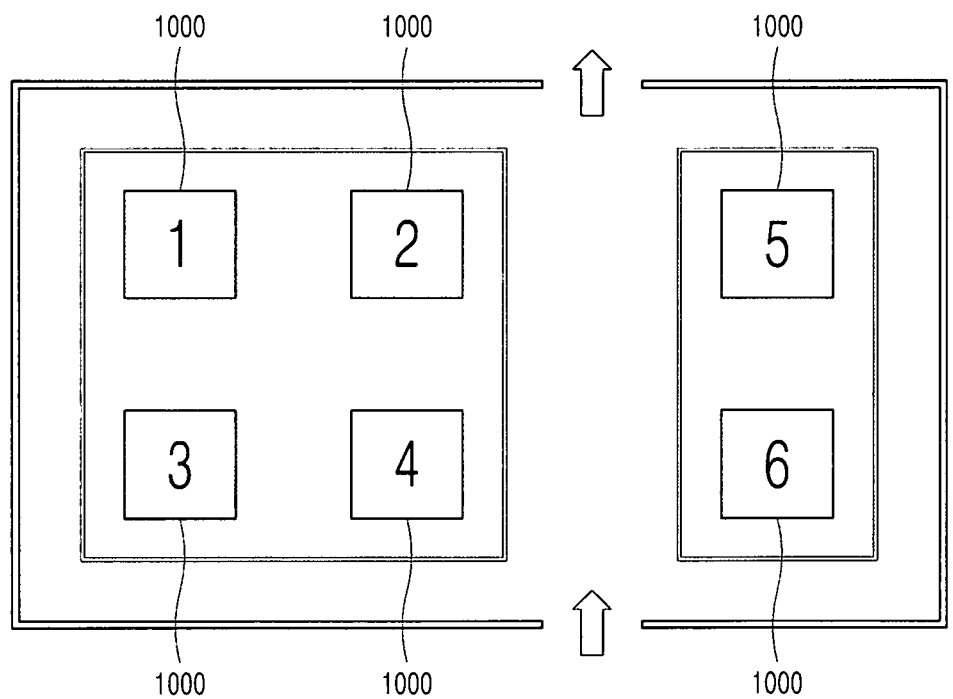
FIG. 3 is a diagram schematically illustrating an electric vehicle charging station according to an embodiment.

FIG. 3 is a diagram schematically illustrating an electric vehicle 10 charging station according to an embodiment. The vehicle 10 may enter and exit the charging station through an entrance and an exit indicated by arrows. The charging station may include the plurality of chargers 400 for charging, and parking spaces where the plurality of vehicles 10 park for charging.

Each of the parking spaces may include the available charging area 1000. The available charging area 1000 may be marked with an identification number for easy identification. One vehicle 10 may be parked in one available charging area 1000 for charging. Although six available charging areas 1000 in total are illustrated in FIG. 3, the charging station may have five or less available charging areas 1000, or seven or more available charging areas 1000. In addition, an identification number of the available charging area 1000 may also be used as the identification number of the parking space.

An appropriate number of chargers 400 may be included in an appropriate position in the parking space. The number of available charging areas 1000 and the number of chargers 400 may not be the same.

The available charging area 1000 may be set for charging of the vehicle 10. For example, the vehicle 10 may only be charged when the electric charging port 11 provided in the vehicle 10 enters the available charging area 1000.

Features such as size and location of the available charging area 1000 may be set according to a structure of the charger 400. For instance, the available charging area 1000 may vary according to, for example, a length of a cable port provided in the charger 400 and partially inserted into the charging port 11 of the vehicle 10 to electrically connect the vehicle 10 and the charger 400, a size of the charger 400, an arrangement position of the charger 400 in the charging station, and a structure of the charger 400. Thus, based on the above elements, features such as size and location of the available parking area may be properly selected.

To allow the charging port 11 of the vehicle 10 to enter the available charging area 1000, the controller 100 may need to analyze an arrangement position of the charging port 11 in the vehicle 10. The arrangement position of the charging port 11 may vary depending on, for example, size and type of the vehicle 10.

A location of the charging port 11 may be changed due to a structural attribute of the electric vehicle 10. Thus, it is necessary to park the vehicle 10 so that the charging port 11 may enter the available charging area 1000 by accurately analyzing the arrangement position of the charging port 11 in the vehicle 10, and then proceed with charging.

Figure 4A:
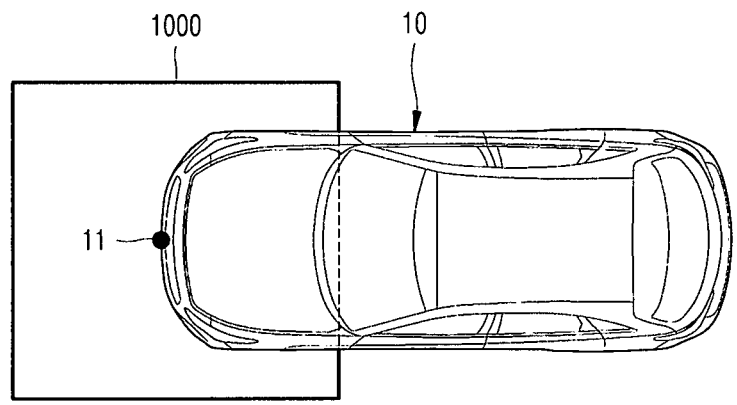
FIGS. 4A and 4B are diagrams illustrating an available charging area of an electric vehicle according to an embodiment.
Figure 4B:
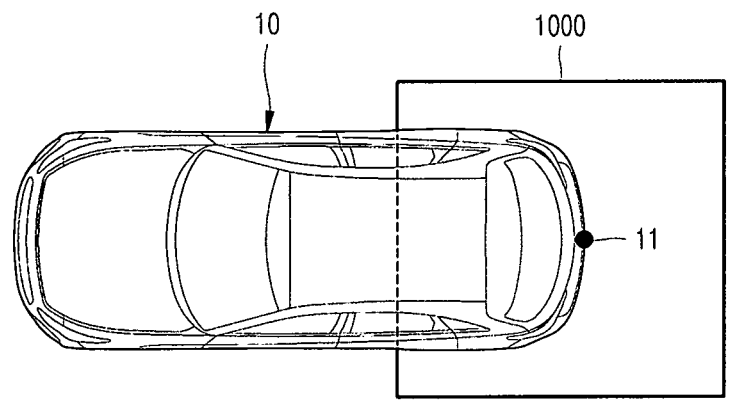

The charging port 11 may be provided on, for example, a side of the vehicle 10, a front of the vehicle 10, and a rear of the vehicle 10. FIGS. 4A and 4B are diagrams illustrating an available charging area 1000 of an electric vehicle 10.

FIGS. 4A and 4B illustrate examples of a state in which the vehicle 10 is parked in order to insert the charging port 11 into the available charging area 1000, when the charging port 11 is disposed in the front of the vehicle 10 and when the charging port 11 is disposed in the rear of the vehicle 10 in the same available charging area 1000, respectively. FIG. 4A illustrates a case where the charging port 11 is located on the front of the vehicle 10, and FIG. 4B illustrates a case where the charging port 11 is located on the rear of the vehicle 10.

Comparing FIGS. 4A and 4B, even when the vehicle 10 is parked in the same available charging area 1000 for charging, a parking location of the vehicle 10 may be changed according to the location of the charging port 11. Thus, the controller 100 may need to accurately analyze the location of the charging port 11 of the vehicle 10.

The charging port 11 of the vehicle 10 may be divided into a case of the vehicle 10 being a member vehicle and a case of the vehicle 10 being a nonmember vehicle, and may be analyzed by different methods.

In the case of the member vehicle 10, the controller 100 may analyze the location of the charging port 11 in the vehicle 10 from registered vehicle information about the vehicle 10. During registration of the member vehicle 10, the owner or the driver of the vehicle 10 may enter vehicle information about the vehicle 10. Here, the location of the charging port 11 may be added to the vehicle information.

The input vehicle information may be stored in the server 20. The controller 100 may receive the vehicle information from the server 20 and may accurately analyze the location of the charging port 11 of the member vehicle 10.

When the original location of the charging port 11 of the vehicle 10 changes due to reasons such as modification of the vehicle 10, the owner or the driver of the vehicle 10 may update the changed location of the charging port 11 to the server 20. The controller 100 may receive the changed location of the charging port 11 from the server 20.

In the case of the nonmember vehicle 10, the controller 100 may analyze the location of the charging port 11 in the vehicle 10 from the exterior of the vehicle 10 and the license plate number of the vehicle 10 captured by the camera 200. For example, the vehicle 10 type may be analyzed from the license plate number of the vehicle 10. When analyzing the vehicle 10 type from the license plate number is not possible, and the vehicle 10 type may be analyzed from the exterior of the vehicle 10.

The controller 100 may analyze the location of the charging port 11 of the vehicle 10 from structural information of a vehicle 10 that is same type as the analyzed vehicle 10 type. Here, the structural information of the vehicle 10 may be received from, for example, the server 20.

When the vehicle 10 moves and parks for charging after the location of the charging port 11 of the vehicle 10 is analyzed, the controller 100 may guide the charging port 11 to enter the available parking area and may determine whether the charging port 11 has entered the available parking area. When the charging port 11 is not in the available parking area, the controller 100 may guide the movement of the vehicle 10.

The controller 100 may transmit, to the guide unit 300, information about the parking location of the vehicle 10 in the charging station and the available charging area 1000. Here, the vehicle 10 may be guided by designating the parking location such that the member vehicle 10 is charged by the charger 400 for members and that the nonmember vehicle 10 is charged by the charger 400 for nonmembers.

The guide unit 300 may guide the parking location of the vehicle 10 and may display an image indicating the available charging area 1000 according to the information received from the controller 100. The guide unit 300 used to display the image may be at least one of the signage 310, the output device 320, or the display 340, and may vary depending on whether the vehicle is a member vehicle or a nonmember vehicle, as described above.

The guide unit 300 may output the voice that guides the parking location of the vehicle 10. The voice may be outputted by at least one of the speaker 330 or the output device 320 and may vary depending on whether the vehicle is a member vehicle or a nonmember vehicle, as described above.

For example, the parking location may be guided by using an identification number of an available parking area, and the guide unit 300 may guide the parking location of the vehicle 10 by outputting the identification number of the available parking area through voice or image.

The vehicle 10 may need to be parked such that the charging port 11 may enter the available charging area 1000 as illustrated in FIG. 4A or 4B, according to the location of the charging port 11. The controller 100 may determine whether the charging port 11 provided in the vehicle 10 is in the available charging area 1000.

For example, since the controller 100 already knows the location of the charging port 11 in the vehicle 10 from acquired information about the vehicle 10, the controller 100 may determine whether the charging port 11 is in the available charging area based on the image of the vehicle 10 captured by the camera 200 and the location of the charging port 11 in the vehicle 10.

When the charging port 11 is not in the available charging area 1000, the controller 100 may transmit guidance information to the guide unit 300. The guide unit 300 receiving the guidance information from the controller 100 may guide movement and a movement direction of the vehicle 10 such that the charging port 11 enters the available charging area 1000.

The movement and the movement direction of the vehicle 10 may be guided by displaying a symbol, such as an arrow, or by outputting a sentence containing words such as "forward" and "reverse" through voice.

When the charging port 11 enters the available charging area 1000, guiding of the movement and the movement direction of the vehicle 10 by the controller 100 and the guide unit 300 may be terminated, and the driver may charge the vehicle 10.

Figure 5:
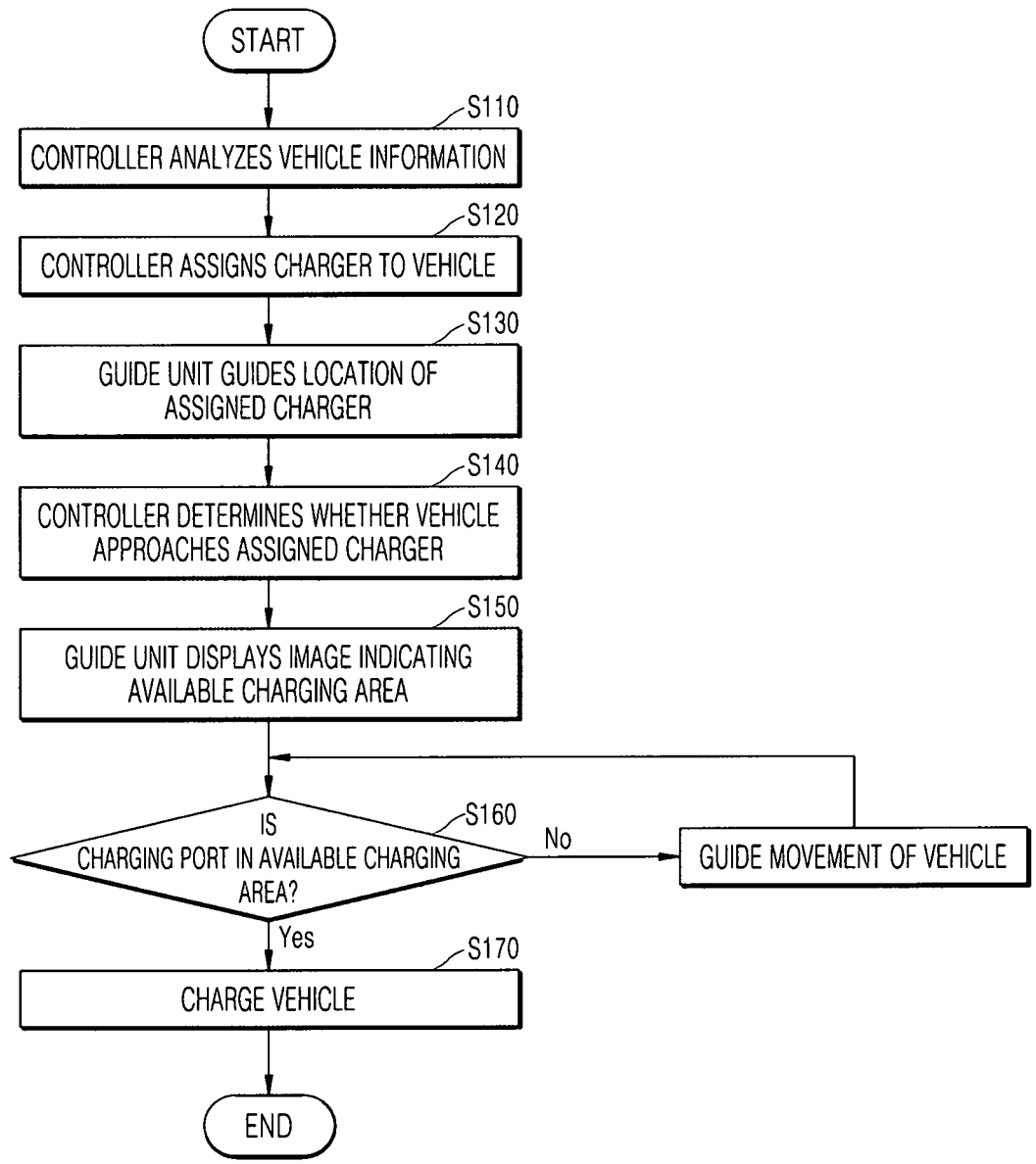
FIG. 5 is a flowchart illustrating an operation method of an electric vehicle charging system according to an embodiment.

FIG. 5 is a flowchart illustrating an operation method of an electric vehicle charging system according to an embodiment.

The controller 100 may analyze vehicle information about the vehicle 10 (S110). When the vehicle 10 approaches an entrance of the charging station, the camera 200 provided in the charging station may recognize and capture the exterior and the license plate of the vehicle 10, and may transmit an image of the exterior and the license plate of the vehicle 10 to the controller 100. The controller 100 may analyze information required for charging, for example, whether the vehicle 10 is a member vehicle, whether the vehicle 10 is an electric vehicle, and the location of the charging port 11, from the exterior and the license plate of the vehicle 10.

The controller 100 may assign the charger 400 to the vehicle 10 based on the analyzed vehicle information (S120). When the vehicle 10 is not an electric vehicle, the controller 100 may request the vehicle 10 not to enter the charging station, via the guide unit 300. The controller 100 may classify vehicles 10 into member vehicles and nonmember vehicles, and may assign the charger 400 for members and the charger 400 for nonmembers to a member vehicle and a nonmember vehicle, respectively.

The guide unit 300 may guide a location of the assigned charger 400 (S130). The controller 100 may transmit information about assignment of the vehicle 10 to the guide unit 300. Accordingly, the guide unit 300 may inform the vehicle 10 of the location of the assigned charger 400 by outputting an image and a voice, and may guide the vehicle 10 to move to the assigned charger 400.

The controller 100 may determine whether the vehicle 10 approaches the assigned charger 400 (S140). The controller 100 may receive the image of the exterior, the license plate of the vehicle 10, and the current location of the vehicle 10 through the camera 200, and may determine, based on the received image and information about the location of the assigned charger 400, which is stored in advance, whether the vehicle 10 approaches the assigned charger 400.

When the vehicle 10 approaches another charger 400 instead of the assigned charger 400, the controller 100 may guide the vehicle 10 to move to the assigned charger 400 via the guide unit 300.

When the vehicle 10 approaches the assigned charger 400, the guide unit 300 may display an image indicating the available charging area 1000 (S150). The driver of the vehicle 10 may view the displayed image, and may move the vehicle 10 such that the charging port 11 may enter the available charging area 1000.

The controller 100 may determine whether the charging port 11 provided in the vehicle 10 is in the available charging area 1000 (S160). The controller 100 may receive the image of the exterior, the license plate of the vehicle 10, and the current location of the vehicle 10 through the camera 200, and may determine, based on the received image and information about the location of the charging port 11 in the vehicle 10 and the location of the available charging area 1000 which is stored in advance, whether the charging port 11 of the vehicle 10 is in the available charging area 1000.

When the charging port 11 of the vehicle 10 is not in the available charging area 1000, the controller 100 may guide movement of the vehicle 10 and the movement direction of the vehicle 10 via the guide unit 300. In response, the driver of the vehicle 10 may move the vehicle 10 to make the charging port 11 enter the available charging area 1000.

When the charging port 11 of the vehicle 10 enters the available charging area 1000, the controller 100 may inform the vehicle 10 of the movement of the vehicle 10 being completed via the guide unit 300. In a state in which the charging port 11 enters the available charging area 1000, the vehicle 10 may be charged (S170).

When charging of the vehicle 10 is completed, the controller 100 may guide a location of an exit of the charging station and a path from the current location of the vehicle 10 to the exit, via the guide unit 300, and may provide convenience when exiting the charging station.

In an embodiment, the electric vehicle charging system may guide information required for charging of the vehicle 10 in the charging station via the guide unit 300, thereby enhancing convenience when charging the vehicle 10 and promoting quick charging.

In an embodiment, the electric vehicle charging system may distinguish member vehicles 10 from nonmember vehicles 10, and may provide a differentiated service that favors member vehicles 10, thereby inducing the owner or the driver of the vehicle 10 to receive member services.

The differentiated service favoring member vehicles 10 may include, for example, adjusting a ratio of the number of chargers 400 for members to the number of chargers 400 for nonmembers such that an estimated waiting time for charging of the member vehicle 10 is less than an estimated waiting time for charging of the nonmember vehicle 10, which will be described in detail below.

Figure 6:
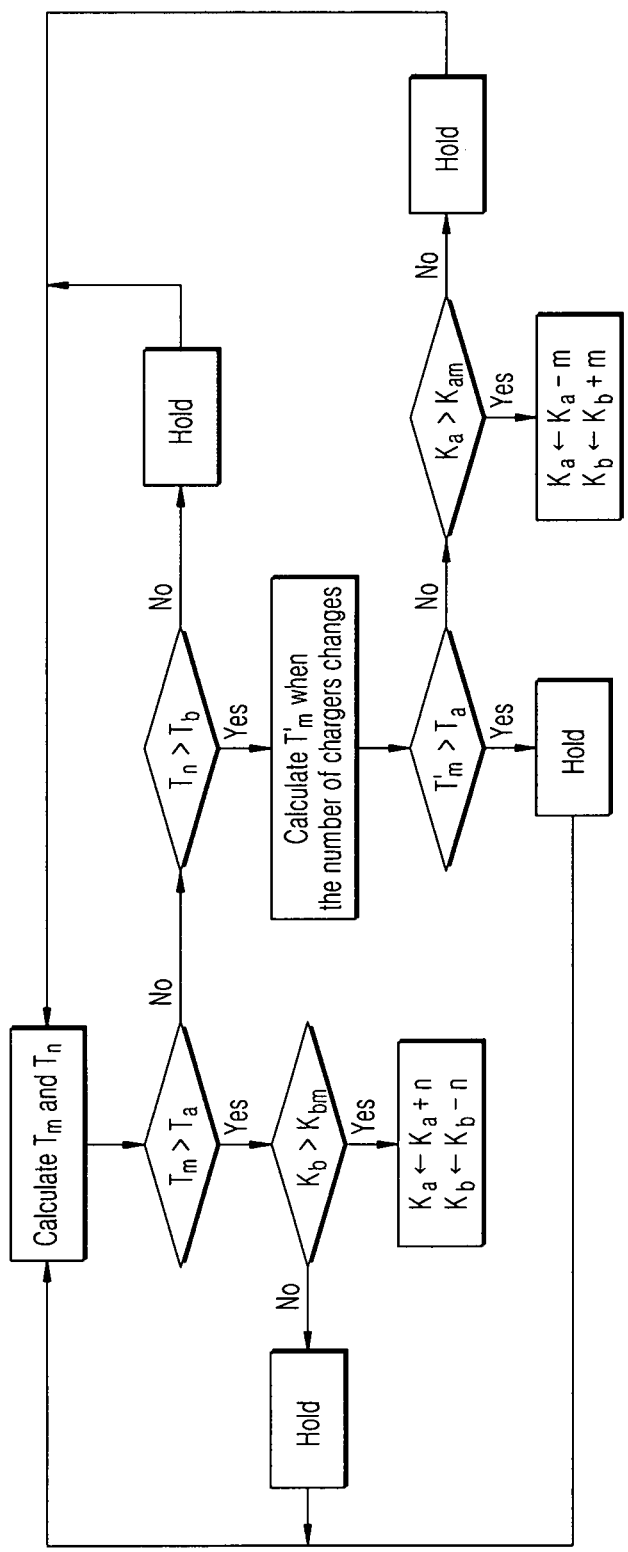
FIG. 6 is a flowchart illustrating an operation method of an electric vehicle charging system according to an embodiment.

FIG. 6 is a flowchart illustrating an operation method of an electric vehicle charging system according to an embodiment. The electric vehicle charging system may adjust a ratio of the number of chargers for members to the number of chargers for nonmembers according to an estimated waiting time for charging of the vehicle 10.

Symbols shown in FIG. 6 have the following meanings:
Ka: The number of chargers 400 for members
Kb: The number of chargers 400 for nonmembers
The total number of chargers 400 obtained by adding the number Ka of chargers 400 for members and the number Kb of chargers 400 for nonmembers may have a predetermined value.

Tm: Estimated waiting time for charging of the member vehicle 10

Tn: Estimated waiting time for charging of the nonmember vehicle 10

The estimated waiting time for charging may refer to a period of time from the point when the vehicle 10 arrives at the charging station to the point immediately before charging starts, and the controller 100 may calculate the estimated waiting time for charging for each vehicle 10, based on, for example, the number of vehicles 10 currently being charged, the number of vehicles 10 waiting for charging, an average charging time of vehicles 10, and an average moving time of vehicles 10 in the charging station.

Ta: Expected waiting time for charging of the member vehicle 10

Tb: Expected waiting time for charging of the nonmember vehicle 10

An expected waiting time for charging may be a reasonable period of time the driver is required to wait for charging and may be set to a specific value.

Kam: The minimum number of chargers 400 for members
Kbm: The minimum number of chargers 400 for nonmembers The minimum number of chargers 400 for members may be the minimum number of chargers 400 that may be assigned for members, and the minimum number of chargers 400 for nonmembers may be the minimum number of chargers 400 that may be assigned for nonmembers. Kam and Kbm may be properly set values. In addition, although Ka and Kb may vary, Ka may be greater than or equal to Kam and Kb may be greater than or equal to Kbm at all times.

The controller 100 may control the number Ka of chargers 400 for members and the number Kb of chargers 400 for nonmembers such that each of the numbers Ka and Kb may be maintained to be equal to or greater than a set value.

T'm: Estimated waiting time for charging of the member vehicle 10 that changes when the number of chargers 400 changes In FIG. 6, Hold may refer to maintaining the number Ka of chargers 400 for members and the number Kb of chargers 400 for nonmembers without any change.

To adjust the ratio of the number of chargers 400 for members to the number of chargers 400 for nonmembers, the controller 100 may calculate the estimated waiting time Tm for charging of the member vehicle 10 and the estimated waiting time Tn for charging of the nonmember vehicle 10.

When the estimated waiting time Tm for charging of the member vehicle 10 is greater than a set expected waiting time Ta for charging of the member vehicle 10, and when the number Kb of chargers 400 for nonmembers is greater than the minimum number Kbm of chargers 400 for nonmembers, the controller 100 may increase the number of chargers 400 for members and may decrease the number of chargers 400 for nonmembers.

Here, the number of chargers 400 for members may be increased by "n" and the number of chargers 400 for nonmembers may be reduced by "n," thus the total number of chargers 400 may remain constant.

A value of "n" may be a maximum value of a natural number that satisfies "Tm>Ta" and "Kb>Kbm." When the number of chargers 400 for members is increased so that it satisfies conditions for "Tm>Ta" and "Kb>Kbm," it may be possible to provide convenience and quick charging to the member vehicle 10 in a state that is not disadvantageous for the nonmember vehicle.

When the number of nonmember vehicles 10 is greater than the number of member vehicles 10 among vehicles 10 waiting to be charged, the waiting time for charging of the nonmember vehicle 10 may be extended, which may cause the nonmember vehicle 10 to have a disadvantage in comparison to the member vehicle 10.

There is a need to make adjustments to offset the disadvantage of the nonmember vehicle 10 due to the member vehicle 10 having a priority in service. The disadvantage of the nonmember vehicle 10 may be offset by a method described below.

When the estimated waiting time Tm for charging of the member vehicle 10 is less than or equal to the set expected waiting time Ta for charging of the member vehicle 10, when the estimated waiting time Tn for charging of the nonmember vehicle 10 is greater than a set expected waiting time Tb for charging of the nonmember vehicle 10, and when the number Ka of chargers 400 for members is greater than a set minimum number Kam of chargers 400 for members, the controller 100 may increase the number of chargers 400 for nonmembers and may decrease the number of chargers 400 for members.

Here, the number of chargers 400 for members may be reduced by "m" and the number of chargers 400 for nonmembers may be increased by "m," thus the total number of chargers 400 may remain constant.

A value of "m" may be a maximum value of a natural number that satisfies "Tm≤Ta," "Tn>Tb," "Ka>Kam." When the number of chargers 400 for nonmembers is increased so that it satisfies conditions for "Tm≤Ta," "Tn>Tb," and "Ka>Kam," it may be possible to provide convenient and quick charging to the member vehicle 10, and the disadvantage of the nonmember may be eliminated or reduced.

When the number of chargers 400 changes, the controller 100 may calculate the changed estimated waiting time T'm for charging of the member vehicle 10.

When the number of chargers 400 for members and the number of chargers 400 for nonmembers change, and when the changed estimated waiting time T'm for charging of the member vehicle 10 is greater than the set expected waiting time Ta for charging of the member vehicle 10, the controller 100 may maintain a ratio of the changed number of chargers 400 for members to the changed number of chargers 400 for nonmembers without any change, even when the conditions for "Tm≤Ta," "Tn>Tb," and "Ka>Kam" are satisfied.

When "T'm>Ta" is satisfied due to a change in the ratio of the number of chargers 400 for members to the number of chargers 400 for nonmembers, the member vehicle 10 may have a disadvantage. For this reason, an occurrence of a greater disadvantage in the member vehicle 10 when the number of chargers 400 for members is further reduced needs to be prevented.

The controller 100 may repeatedly and continuously calculate Tm, Ta, and T'm, and may change or maintain the ratio of the number of chargers 400 for members to the number of chargers 400 for nonmembers in the charging station, according to a change in situation.

In embodiments, a quicker charging service may be provided to the member vehicle 10 by adjusting the ratio of the number of chargers 400 for members to the number of chargers 400 for nonmembers. Thus, it is possible to induce the owner and the driver of the vehicle 10 to receive member services.

Although only a few embodiments have been described above, various other forms may be implemented. The technical contents of the embodiments described above may be combined in various forms as long as they are not incompatible technologies, and thus, may be implemented in new forms.

What is claimed is:

1. An electric vehicle charging system used for operation of an electric vehicle charging station, the electric vehicle charging system comprising:
    a controller;
    a camera configured to capture a vehicle that is present in a charging station and transmit image information about the vehicle to the controller;
    a guide unit configured to receive guidance from the controller and output the guidance; and
    a plurality of chargers provided in the charging station and communicably connected to the controller,
    wherein the controller is configured to:
        analyze information about the vehicle based on the image information received from the camera;
        guide a member vehicle registered to receive charging service to move to a charger for members;
        guide a nonmember vehicle to move to a charger for nonmembers; and
        adjust a ratio of the number of chargers for members to the number of chargers for nonmembers according to an estimated waiting time for charging of the vehicle.

2. The electric vehicle charging system according to claim 1, wherein
    the camera captures an exterior of the vehicle and a license plate number of the vehicle, and transmits an image of the exterior of the vehicle and the license plate number of the vehicle to the controller, and
    the guide unit comprises a signage disposed in the charging station, an output device mounted in the vehicle and configured to output at least one of an image or a voice, a speaker disposed in the charging station, and a display disposed in the charger.

3. The electric vehicle charging system according to claim 2, wherein
    when the vehicle is a member vehicle, the guide unit provides guidance by using at least one of the signage, the output device, the speaker, or the display.

4. The electric vehicle charging system according to claim 2, wherein
    when the vehicle is a nonmember vehicle, the guide unit provides guidance by using at least one of the signage, the speaker, or the display.

5. The electric vehicle charging system according to claim 1, wherein
    the controller transmits information about a parking location of the vehicle in the charging station and an available charging area for the vehicle to the guide unit, and
    the guide unit guides the parking location of the vehicle and displays an image indicating the available charging area.

6. The electric vehicle charging system according to claim 5, wherein
    the guide unit outputs a voice that guides the parking location of the vehicle.

7. The electric vehicle charging system according to claim 5, wherein
    the controller determines whether a charging port provided in the vehicle is in the available charging area, and
    when the charging port is not in the available charging area, the guide unit guides a movement and a movement direction of the vehicle such that the charging port enters the available charging area.

8. The electric vehicle charging system according to claim 7, wherein
    when the vehicle is a member vehicle, the controller analyzes a location of the charging port in the vehicle from registered vehicle information.

9. The electric vehicle charging system according to claim 7, wherein
    when the vehicle is a nonmember vehicle, the controller analyzes a location of the charging port in the vehicle from the exterior of the vehicle and the license plate number of the vehicle captured by the camera.

10. The electric vehicle charging system according to claim 1, wherein
    the controller assigns the chargers to the plurality of vehicles, and
    when the vehicle approaches a charger that is not assigned, the guide unit guides the vehicle such that the vehicle moves to the location of the charger that is assigned to the vehicle.

11. An operation method of an electric vehicle charging system, the operation method comprising:
    analyzing, by a controller, vehicle information;
    assigning, by the controller, a charger to a vehicle;
    guiding, by a guide unit, a location of the assigned charger;
    determining, by the controller, whether the vehicle approaches the assigned charger;
    displaying, by the guide unit, an image indicating an available charging area;
    determining, by the controller, whether a charging port provided in the vehicle is in the available charging area; and charging the vehicle,
wherein the controller is configured to:
analyze information about the vehicle based on image information received from a camera;
guide a member vehicle registered to receive charging service to move to a charger for members;
guide a nonmember vehicle to move to a charger for nonmembers; and
adjust a ratio of the number of chargers for members to the number of chargers for nonmembers according to an estimated waiting time for charging of the vehicle.

12. The operation method according to claim 11, wherein the total number of chargers obtained by adding the number of chargers for members and the number of chargers for nonmembers has a predetermined value, and
the controller controls the number of chargers for members and the number of chargers for nonmembers such that each of the number of chargers for members and the number of chargers for nonmembers is maintained to be equal to or greater than a set value.

13. The operation method according to claim 11, wherein when the estimated waiting time for charging of the member vehicle is greater than a set expected waiting time for charging of the member vehicle, and when the number of chargers for nonmembers is greater than a set minimum number of chargers for nonmembers, the controller increases the number of chargers for members and decreases the number of chargers for nonmembers.

14. The operation method according to claim 11, wherein when the estimated waiting time for charging of the member vehicle is less than or equal to the set expected waiting time for charging of the member vehicle, when the estimated waiting time for charging of the nonmember vehicle is greater than a set expected waiting time for charging of the nonmember vehicle, and when the number of chargers for members is greater than a set minimum number of chargers for members, the controller increases the number of chargers for nonmembers and decreases the number of chargers for members.

15. The operation method according to claim 14, wherein when the number of chargers for members and the number of chargers for nonmembers are changed, and when a changed estimated waiting time for charging of the member vehicle is greater than the set expected waiting time for charging of the member vehicle, the controller maintains a ratio of the changed number of chargers for members to the changed number of chargers for nonmembers.

* * * * *